E. ERICKSON.
GRAIN, HAY, AND MANURE LOADER.
APPLICATION FILED JULY 26, 1909.
966,433.
Patented Aug. 9, 1910.
2 SHEETS—SHEET 1.
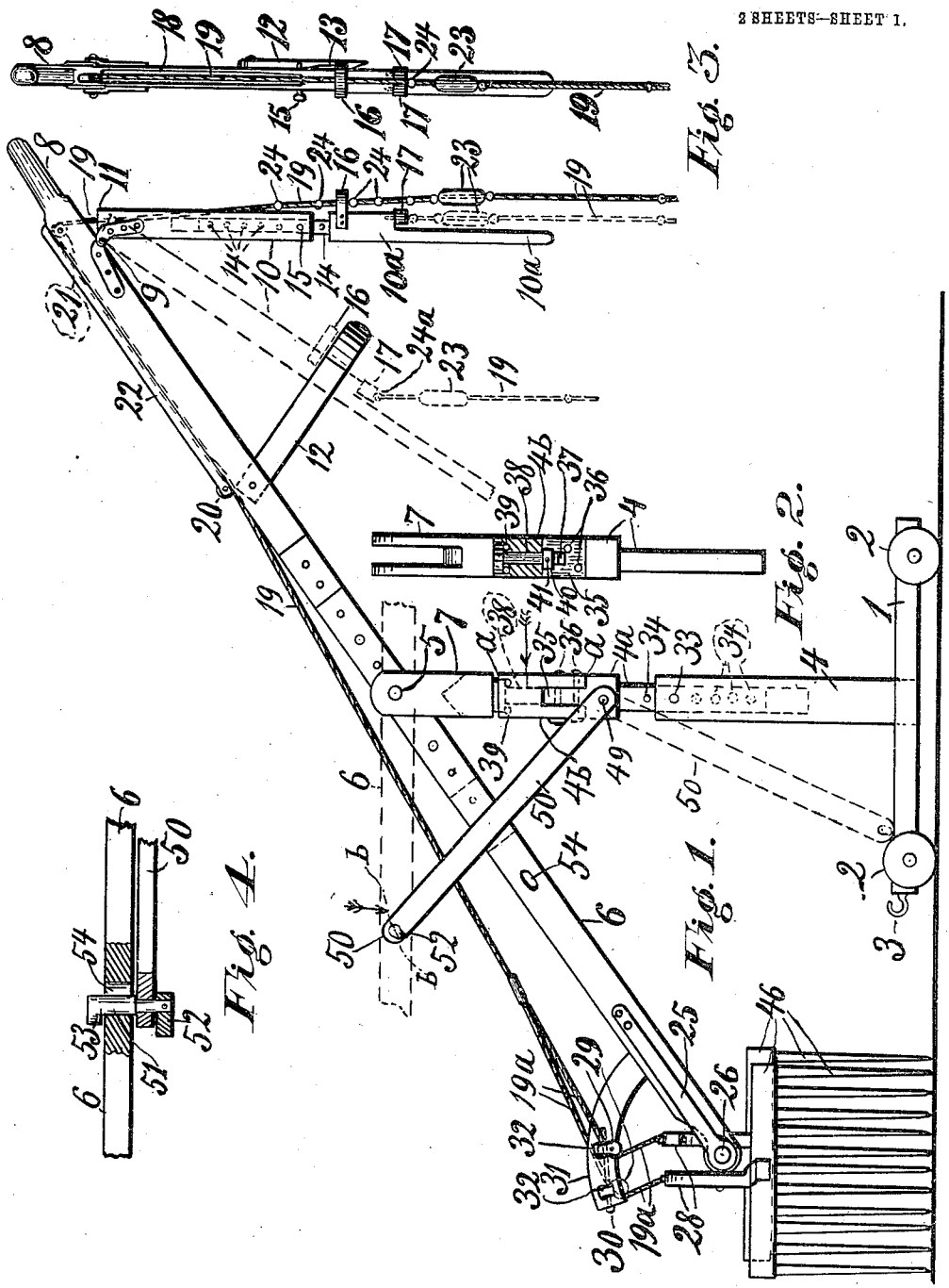
WITNESSES:
A. E. Carlsen.
L. C. Carlsen.
INVENTOR:
Eric Erickson.
BY his ATTORNEY:
A. M. Carlsen.

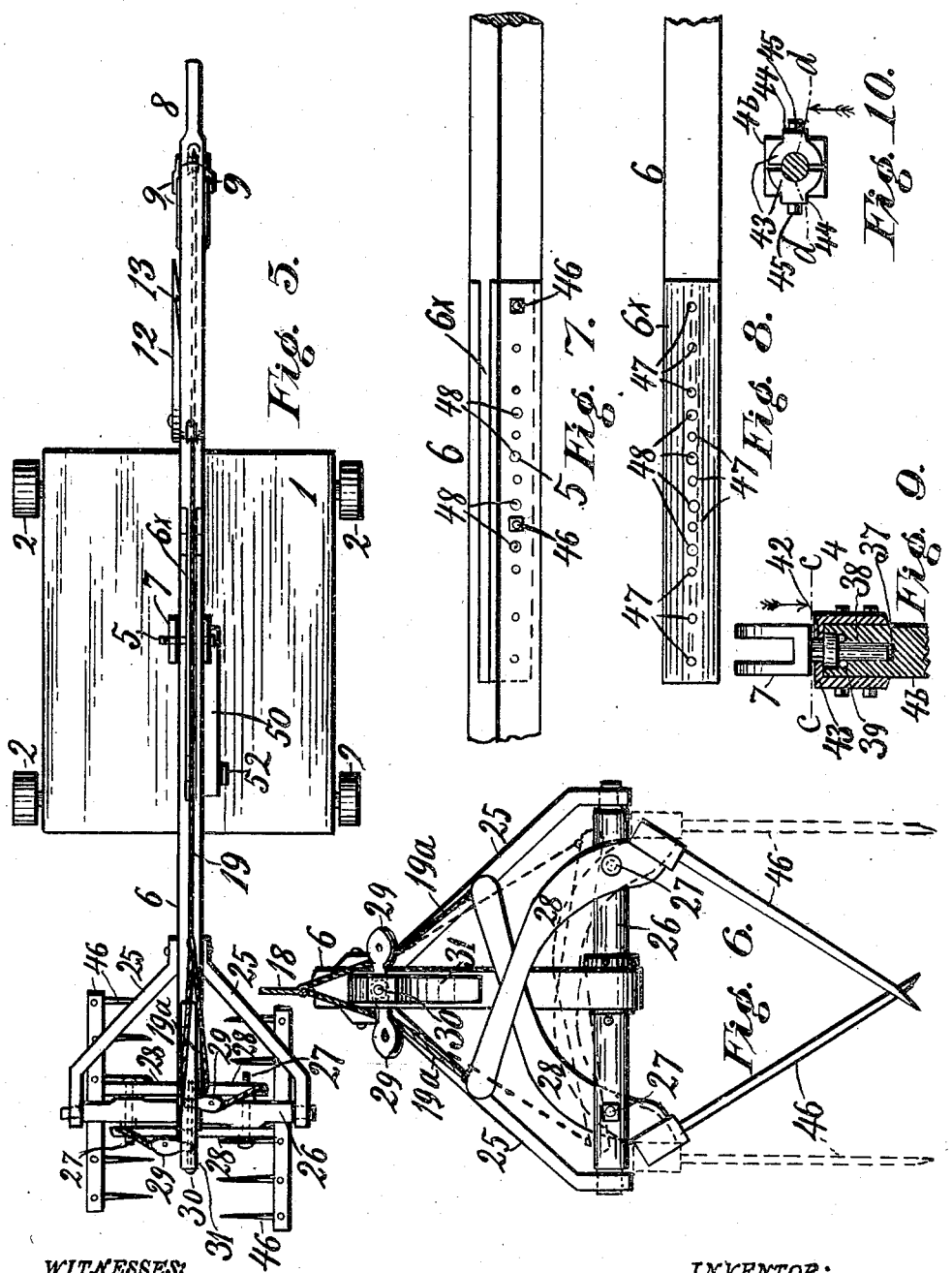

UNITED STATES PATENT OFFICE.

ERIC ERICKSON, OF ST. PAUL, MINNESOTA.

GRAIN, HAY, AND MANURE LOADER.

966,433.  Specification of Letters Patent.  Patented Aug. 9, 1910.

Application filed July 26, 1909. Serial No. 509,725.

*To all whom it may concern:*

Be it known that I, ERIC ERICKSON, a subject of the King of Sweden, who have declared my intention to become a citizen of the United States, residing at St. Paul, in the county of Ramsey and State of Minnesota, have invented a new and useful Grain, Hay, and Manure Loader, of which the following is a specification.

My invention relates to devices for loading grain, hay, manure and other materials upon wagons and sleighs; and the principal object is to provide an easily portable and convenient hand-operated device of said kind.

In the accompanying drawings, Figure 1 is a side elevation of my improved loader. Fig. 2 is a right hand detail view of the upper part of the upright in Fig. 1, intersected on the line $a$—$a$ thereof. Fig. 3 is a right hand end elevation of Fig. 1. Fig. 4 is an enlarged section on the line $b$—$b$ in Fig. 1. Fig. 5 is a top or plan view of the entire device in Fig. 1 with the loading forks partly closed. Fig. 6 is an enlarged front elevation of the loading forks and adjacent parts supporting and operating same, looking from left to right in Figs. 1 or 5. Fig. 7 is an enlarged perspective view of the middle portion of the operating beam or lever of the device. Fig. 8 is a side view of Fig. 7. Fig. 9 is a modification of the structure shown in Fig. 2 intersected on the line $d$—$d$ in Fig. 10. Fig. 10 is a horizontal section of the modified form in Fig. 9 on the line $c$—$c$ thereof.

Referring to the drawings by reference numerals, 1 designates a platform adapted to rest on the ground, preferably on wheels 2 so as to be easily portable by hitching a horse to the hook 3 fixed at one end of the platform. In the middle of the platform is fixed an upright 4, in whose bifurcated swivel jointed piece 7 is fulcrumed on a pivot pin 5 a beam lever 6, which is the operating lever of the device and in an ordinary size of the device may be about sixteen feet long. The rear end of said lever is provided with a handle 8, and a little forward thereof is suspended from a hinge 9 an operating rod 10, whose upper end corner 11 abuts against the main lever when the rod and the lever are at about right angles to each other. 12 is a spring arm carried by the main lever and provided with a notch 13 by which to engage and hold the handle rod 10 in the inclined position shown in dotted lines in Fig. 1 so as to free the rod from the ground when the handle end of the operating lever is pulled down to its lowest positions. The handle rod 10 is extensible by having its lower section $10^a$ inserted in the upper section and provided with a series of holes 14 adapted to be engaged alternately by a pin 15 passed through the upper section. The section $10^a$ also carries a rope-guide 16 and there-below two parallel rollers 17, while the upper section 10 is partly grooved at 18 (see Fig. 3) for a fork-closing cord 19, presently to be fully described, which is passed along the top of the beam lever 6, is guided by two sheaves 20 and 21, mounted the latter in the lever and the former in the front end of a strip 22 by which the rope is covered from contact with the operator's hands when he manipulates the lever. Said cord passes from the sheave 21 down the groove 18 and is provided with a fixed handle 23 and thereabove with a series of knots or obstructions 24, either of which may be engaged with the lower ends of the rollers 17 by passing the cord in between the rollers as at $24^a$ in Fig. 1.

In the front end of the operating lever 6 and in the side arms 25 secured thereto, is journaled a rock shaft 26, to whose opposite sides are pivotally mounted on bolts 27 near the ends thereof, two levers 28, each of which has its longest arm secured to and operated by a branching arm $19^a$ of the rope 18, said rope arms being guided by sheaves in sheave hoods or blocks 29, which are mounted one at each side of an upwardly arched arm 31 provided upon the front end of the operating lever and being preferably formed with apertures 32 in which the ends of the blocks 29 are loosely inserted and held by a pin 30 passed loosely through them but it is tightly driven into the arm 31. Each of said levers 28 has to its shorter arm fixed a broad fork 46.

The post or upright 4 is extensible by having its lowest section 4 hollow and provided with a transverse pin 33 adapted for engagement with either of the holes 34 of the next section $4^a$ which is inserted in the section 4. The section $4^a$ has a tenon 35 removably held in a still higher section $4^b$ by bolts 36. In said tenon is inlaid a steel plate 37 (see Fig. 2) upon which rests and rotates the end of the cylindrical stem 38 of the fork or top section 7, which is thus journaled in the top of section $4^b$ and further supported by roller bearings 39 therein; the stem being retained against upward movement by a collar 40 having a set screw 41. The structure just described is in Figs. 9 and 10 so modified that instead of a collar and set screw the fork 7 is retained in place by having an annular groove 42 engaged by the segmental tops 43 of flat arms 44 secured by cap screw 45 to opposite sides of the section $4^b$.

As best shown in Figs. 7 and 8, the main lever 6 is extensible both in front and rear of its fulcrum 5, the lever being made up of two sections, one of which has a tenon $6^x$ passed into a bifurcation of the other section and said other section having two removable bolts 46 adapted to engage in any two of the holes 47 of the tenon, said tenon and the adjacent parts of the other section having several holes 48 equidistant a part for the reception of the fulcrum pivot 5.

To the standard 4 is pivoted at 49 one end of a brace 50, having in its other end journaled a short shaft 51, which is at one end provided with a handle 52 and at the other end with a lateral latching hook 53, adapted to be passed through a slotted hole 54 in the lever and by being turned away from the slot will engage the side of the lever and thus prevent the latter from swinging laterally relative to the standard 4, and at the same time the lever is by said brace held in a horizontal position while the device is idle or being transported.

The operation of the device is quite simple; the device is moved near the hay stack, grain shock or other stuff to be loaded upon a wagon or other vehicle provided near by; the operator takes hold of the handle $10^a$ and with the cord or rope 19 thereon released from the roller 17, and thus the fork tines hanging plumb down as in dotted lines in Fig. 6, he permits the forks to tilt the lever 6 quickly, thus plunging the forks into the hay, which action he may assist by pushing upward on the rod $10^a$, he now closes the forks together at their points by pulling down the rope handle 23, when the forks have taken sufficient grip on the hay to lift it the rope is passed laterally in between the rollers 17 so that one of its obstructions 24 engages the lower ends thereof, the rod $10^a$, is now pulled downward until the operator gets full hold of the handle 8, the rod $10^a$ may now be engaged with the hook arm 12, and the operator, having hold of handle 8 and that end of the lever, brings the forks with their load above the wagon and then pulls the rope out of engagement with the rollers 17, and as he leaves the rope slack the weight of the hay and of the tines and lever of the forks will at once spread the forks to a parallel position and drop therefrom upon the vehicle; the forks are now brought back to the supply, the rod $10^a$ disengaged from the hook arm 12, and the operation is repeated until the vehicle is loaded.

When the brace 50 is idle it rests upon the platform, as shown in dotted lines in Fig. 1. It will be understood that the weight of the tines and levers of the forks causes the tines to hang normally in plumb position, with the fork levers resting upon the protruding ends of the pivot bolts 27 of the levers, or any other resting points, like the rock shaft 26, over which the ends of the levers may be curved so as to swing vertically above the same.

Having thus described my invention, what I claim is:

1. In a device of the kind described, the combination of a portable base, a standard fixed thereon and having a swiveled top portion, a beam lever fulcrumed intermediate its ends in said top portion and having its rear end adapted for operation by hand, and at its front end two forwardly inclined side arms and an upwardly and forwardly curved central arm, a rock shaft journaled with its ends in said side arms, a pair of coacting forks having each an operating lever fixed to it and disposed at an angle to the working side of the fork; said levers being pivotally mounted on the rock shaft, one near each end thereof, a rope extending along the beam lever and having its front end provided with two arms, one connected with each fork lever, rope sheaves mounted on the central arm of the beam lever and guiding said rope arms, and means for guiding the rope along the beam lever, and means for holding the rope more or less rearwardly on the beam in a readily detachable manner.

2. In a device of the kind described, the combination of a portable base, a standard fixed thereon and having a swiveled top portion, a beam lever fulcrumed intermediate its ends in said top portion and having its rear end adapted for operation by hand, and at its front end two forwardly inclined side arms and an upwardly and forwardly curved central arm, a rock shaft journaled with its ends in said side arms, a pair of coacting forks having each an operating lever fixed to it and disposed at an angle to the working side of the fork; said levers being pivotally mounted on the rock shaft, one near each end thereof, a rope extending along the beam lever and having its front end provided with two arms, one connected with each fork lever, rope sheaves mounted on the central arm of the beam lever and guiding said rope arms, and means for guiding the rope along the beam lever, and means for holding the rope more or less rearwardly on the beam in a readily detachable manner, a pulling rod pivotally suspended by one end from the handle end of the beam lever and means mounted on the beam lever for engaging and holding the pulling rod inclined toward the beam lever, the said means for holding the rope in stretched position being mounted upon said pulling rod and comprising a pair of anti-friction rollers so arranged that the rope passes snugly between them, said rope having several obstructions adapted to engage the adjacent ends of the rollers.

3. In a device of the kind described, the combination with a portable base and a standard fixed thereon, and having a swiveled top portion, of a beam lever fulcrumed in said top portion and having some distance from its fulcrum a slotted hole, a brace having one end pivoted to the standard and in its other end journaled a short shaft with a thumb piece at one end and at the other end a lateral toe adapted to pass through the slot in the beam lever and engage the opposite side thereof and thus hold the lever against the brace, and also support it in a horizontal position for the purposes set forth.

4. In a device of the kind described, the combination of a portable base or platform an extensible standard fixed thereon, a forked head piece swivel-jointed by ball-bearing in the standard and having a cylindrical stem journaled therein below the ball bearing, and means engaging the swiveled head piece to prevent it from raising in its bearings, and a beam lever fulcrumed in the top of said head piece for the purposes set forth, and a steel plate supporting the bottom end of said stem, said plate being easily removable for exchange with a new one when worn.

5. In a device of the kind described, the combination with a portable platform provided with a standard fixed upon it, of a beam lever fulcrumed in the top of the standard, a pair of coacting forks mounted at the front end of the beam, an extensible operating rod suspended from the rear end of the beam, a rope guide on said rod, and a rope guided by said guide and extending up along the rod and thence along the beam lever to the forks, and having operative connection with said forks to close them with their points toward each other when the rear end of the rope is pulled downward on the operating rod.

6. In a device of the kind described, the combination with a portable platform provided with a standard fixed upon it, of a beam lever fulcrumed in the top of the standard, a pair of coacting forks mounted at the front end of the beam, an extensible operating rod suspended from the rear end of the beam, a rope guide on said rod, and a rope guided by said guide and extending up along the rod and thence along the beam lever to the forks, and having operative connection with said forks to close them with their points toward each other when the rear end of the rope is pulled downward on the operating rod, said platform having supporting wheels, and means for hitching horses to it during transportation.

In testimony whereof I affix my singature, in presence of two witnesses.

ERIC ERICKSON.

Witnesses:
A. M. CARLSEN,
L. C. CARLSEN.